US011874720B2

(12) United States Patent
Citron et al.

(10) Patent No.: US 11,874,720 B2
(45) Date of Patent: *Jan. 16, 2024

(54) METHODS AND SYSTEMS FOR REAL TIME CARBON EMISSION DETERMINATION INCURRED BY EXECUTION OF COMPUTER PROCESSES AND THE OFFSET THEREOF

(71) Applicant: Pledgeling Technologies, Inc., Venice, CA (US)

(72) Inventors: James F. Citron, Venice, CA (US); Gregory C. Yorke, Venice, CA (US); Paul Forsyth, Venice, CA (US); Annie Meng, Venice, CA (US); Alex S. Sung, Venice, CA (US); Anna N. Nordstrom, Venice, CA (US)

(73) Assignee: Pledgeling Technologies, Inc., Venice, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/056,031

(22) Filed: Nov. 16, 2022

(65) Prior Publication Data

US 2023/0324975 A1 Oct. 12, 2023

Related U.S. Application Data

(63) Continuation of application No. 17/658,794, filed on Apr. 11, 2022, now Pat. No. 11,531,387.

(51) Int. Cl.
*G06F 1/32* (2019.01)
*G06F 1/3234* (2019.01)

(52) U.S. Cl.
CPC .................. *G06F 1/3234* (2013.01)

(58) Field of Classification Search
CPC ....................................................... G06F 1/32
See application file for complete search history.

(56) References Cited

U.S. PATENT DOCUMENTS

| 8,470,275 | B2 | 6/2013 | Constantz et al. |
| 8,595,020 | B2 | 11/2013 | Marino |
| 11,531,387 | B1 * | 12/2022 | Citron .................. G06F 1/3234 |
| 2009/0313145 | A1 | 12/2009 | Hamilton, II |
| 2010/0030608 | A1 | 2/2010 | Kaminsky et al. |
| 2010/0107171 | A1 | 4/2010 | Amsterdam |

(Continued)

OTHER PUBLICATIONS

"Bitcoin Energy Consumption Index," Digiconomist, retrieved from https://digiconomist.net/bitcoin-energy-consumption/, printed on May 25, 2022, in 6 pages.

(Continued)

*Primary Examiner* — Paul B Yanchus, III
(74) *Attorney, Agent, or Firm* — Knobbe, Martens, Olson & Bear LLP (57) ABSTRACT

Methods and systems are configured for real time determination of effects incurred by execution of computer processes of networked computer systems and the generation of offsets thereof. A prediction module may be configured to predict the amount of energy utilized by the execution of computer processes by networked computer systems and predict an associated carbon footprint. Methods and systems are configured to determine a selection of offsets and initiate the same via a network communication to remote computer systems.

20 Claims, 5 Drawing Sheets

(56) References Cited

U.S. PATENT DOCUMENTS

| | | |
|---|---|---|
| 2012/0053925 A1 | 3/2012 | Geffin |
| 2015/0372539 A1 | 12/2015 | Livadaras et al. |
| 2016/0034910 A1 | 2/2016 | Davis |
| 2017/0151917 A1 | 6/2017 | Bradley et al. |
| 2017/0358041 A1 | 12/2017 | Forbes, Jr. et al. |
| 2019/0075686 A1 | 3/2019 | Yu et al. |
| 2020/0073466 A1 | 3/2020 | Walsh |
| 2021/0192619 A1 | 6/2021 | Wu |
| 2022/0004926 A1 | 1/2022 | Cella |

OTHER PUBLICATIONS

Nic Carter, "How Much Energy Does Bitcoin Actually Consume?" Harvard Business Review, retrieved from https://hbr.org/2021/05/how-much-energy-does-bitcoin-actually-consume, printed on May 25, 2022, in 6 pages.

* cited by examiner

METHODS AND SYSTEMS FOR REAL TIME CARBON EMISSION DETERMINATION INCURRED BY EXECUTION OF COMPUTER PROCESSES AND THE OFFSET THEREOF

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND OF THE INVENTION

Field of the Invention

The present disclosure generally relates to carbon-based energy usage resulting from computer operations and a reduction of the effects of such carbon-based energy usage.

Background

The utilization of fungible and non-fungible tokens have become ever more important to electronic transactions. However, transactions involving such tokens consume enormous amounts of energy, often obtained from the burning fossil fuels. Such energy consumption may result in climate-damaging carbon emissions. For example, according to one report, a single Bitcoin mining transaction consumes 1,173 kilowatt hours of electricity, approximately enough to power the typical American home for six weeks. Because of the nature of cryptocurrency mining, as increasingly powerful computer systems compete with each other to perform a mining operation, an increasing amount of energy may be needed to process a given transaction.

It is estimated that for each kilowatt hour of electricity used in a mining operation, 2.23 lbs. of CO2 are emitted when the electricity is generated using coal, 2.13 lbs. of CO2 are emitted when the electricity is generated using petroleum, and 0.91 lbs. of CO2 are emitted when the electricity is generated using natural gas. Thus, for example, if coal is used to power a minting operation, 2,616 lbs. of CO2 may be emitted.

Such large amounts of CO2 emissions damage the environment and discourage the use of crypto-tokens. Thus, it is desirable to mitigate the effects of token minting on the environment.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An aspect of the present disclosure relates to electrical computers, digital processing systems and multicomputer data transfers.

An aspect of the present disclosure relates to methods and systems configured to determine, optionally in real time, effects incurred by execution of computer processes of networked computer systems and the generation of offsets thereof. A prediction module may be configured to predict the amount of energy utilized by the execution of computer processes by networked computer systems and predict an associated footprint (e.g., carbon dioxide emissions). Methods and systems are configured to determine a selection of offsets and initiate the same via a network communication to one or more remote computer systems.

An aspect of the disclosure relates to methods, systems, and apparatus configured to perform the prediction, optionally in real time, of carbon emissions (e.g., the emission of carbon dioxide gas) associated with computer operations. Such computer operations may be associated with mining tokens, such as fungible or non-fungible tokens, including the solution of complex mathematical problems. A carbon offset process may be initiated via a transmission between networked computer systems. The prediction and offset process may optionally be initiated in response to a provision of a token to a recipient, such as a non-profit entity.

An aspect of the present disclosure relates to a networked computer system, comprising: a network interface; at least one processing device operable to: receive via the network interface a request for a first transfer of resources from a first source to a first destination; predict energy utilization associated with the execution of computer operations by a plurality of distributed networked computer systems to implement the first transfer of resources from the first source via multicomputer data transfers, the computer operations comprising solving mathematical algorithmic problems and recording a data block on a distributed synchronized database; predict an emission footprint related to the energy utilization associated with the execution of computer operations by the plurality of distributed networked computer systems; automatically select a set of one or more emission offsets; and initiate the selected set of emission offsets by transmitting an instruction to at least one remote networked computer system to implement at least a portion of the selected set of one or more emission offsets.

An aspect of the present disclosure relates to a networked computer system, comprising: a network interface; at least one processing device operable to: receive via the network interface a request for a first transfer of resources from a first source to a first destination; identify an estimate of energy utilization associated with the execution of computer operations by one or more networked computer systems to implement the first transfer of resources from the first source, the computer operations comprising solving mathematical algorithmic problems; access an estimate of an emission footprint related to the energy utilization associated with the execution of computer operations by one or more networked computer systems; identify an emission offset; and initiate the emission offset via a transmission to at least one networked computer system.

An aspect of the present disclosure relates to a computer-implemented method, the method comprising: receiving via over a network a request for a first transfer of resources from a first source to a first destination; predicting an emission amount related to the energy utilization associated with the execution of computer operations by a plurality of distributed networked computer systems, wherein the energy utilization is associated with the execution of the computer operations by the plurality of distributed networked computer systems in implementing the first transfer of resources to the first destination, the computer operations comprising solving mathematical algorithmic problems and recording a data block on a distributed synchronized database; selecting a set of one or more emission offsets; and initiating the selected set of emission offsets by transmitting an instruction to at least one remote networked computer system to implement at least a portion of the selected set of one or more emission offsets.

An aspect of the present disclosure relates to a computer-implemented method, the method comprising: receiving via over a network a request for a first transfer of resources from a first source to a first destination; accessing an estimate of an emission amount related to the energy utilization associated with the execution of computer operations by a plurality of distributed networked computer systems, wherein the energy utilization is associated with the execution of the computer operations by the plurality of distributed networked computer systems in implementing the first transfer of resources to the first destination, the computer operations comprising solving mathematical algorithmic problems; identifying a set of one or more emission offsets; and initiating the identified set of emission offsets by transmitting a communication instruction to at least one remote networked computer system.

An aspect of the present disclosure relates to a non-transitory computer readable medium that stores computer instructions that when executed by a computing device cause the computing device to perform operations comprising: receive a request for a first transfer of resources from a first source to a first destination; estimate an emission amount related to the energy utilization associated with the execution of computer operations by a plurality of distributed networked computer systems, wherein the energy utilization is associated with the execution of the computer operations by the plurality of distributed networked computer systems in implementing the first transfer of resources to the first destination, the computer operations comprising solving mathematical algorithmic problems and recording a data block on a distributed synchronized database; determine a set of one or more emission offsets; and initiate the determined set of emission offsets by transmitting an instruction to at least one computer system to implement at least a portion of the determined set of one or more emission offsets.

BRIEF DESCRIPTION OF THE DRAWINGS

Embodiments will now be described with reference to the drawings summarized below. These drawings and the associated description are provided to illustrate example aspects of the disclosure, and not to limit the scope of the invention.

DETAILED DESCRIPTION

As discussed elsewhere herein, utilization of fungible and non-fungible tokens has become ever more important to electronic transactions. However, transactions involving such tokens consume enormous amounts of energy, often obtained from the burning of fossil fuels. Such energy consumption may result in climate-damaging carbon (e.g., carbon dioxide) or other greenhouse gas emissions.

By way of illustration, mining cryptocurrencies is a highly energy intensive process that uses high speed computers to solve complex algorithmic problems in order to record to the blockchain and receive cryptocurrency tokens. This process is needed to create new tokens and to register transactions on the blockchain.

In order to overcome the technical challenges posed by the mining of such tokens, systems and methods are described that perform predictions/estimates of carbon and/or other greenhouse emissions associated with computer operations, optionally in real time. Such computer operations may be associated with mining tokens, such as fungible or non-fungible token. The mining process may be initiated by a user that is transferring tokens to a specified destination, such as a non-profit entity.

Crypto mining may involve creating new coins, validating cryptocurrency transactions on a blockchain network, or adding cryptocurrency transactions to a distributed ledger. Crypto mining may inhibit the double-spending of digital currency on a distributed network.

In order to offset the environmental impact of greenhouse gasses that are predicted to be emitted as a result of the computer operations (e.g., mining related operations such as crypto mining processes, database recording processes, verification processes, notification processes, hosting processes, currency conversion processes, other processes described herein, and/or other processes), a carbon offset process may be initiated via a transmission by a greenhouse gas mitigation system to a greenhouse gasses offset system. It is understood that although greenhouse gasses are referred to herein by way of example, the systems and processes described herein may be utilized to predict other types of adverse environmental impacts related to the execution of computer operations and instructions, and to the offset thereof.

The prediction and offset process may optionally be initiated in response to receipt of an already minted token (e.g., provided by a donor for provision to a nonprofit charitable entity) and/or in response to a provision of a token to a recipient, such as a non-profit charitable entity, via the networked computer systems described herein.

The greenhouse gas emission prediction may be based on a variety of factors, such as the type of energy that will be or that is predicted to be used to perform the computer operations, server energy consumption for hosting and processing a token transaction, energy consumption for inter-computer communications and delivering communications related to the transaction (e.g., transmission of a receipt to the user that made a token donation to a recipient, transmission to the recipient regarding the donation, recording the transaction on a synchronized distributed database (e.g., a distributed general ledger, such as a blockchain), energy consumption for verifying funds, energy consumption for converting tokens into a government currency that is local to the recipient, and/or other computer operations).

Different cryptocurrencies may utilize different amounts of energy in the minting process. Therefore, the prediction process may adapt to the type of cryptocurrency being provided.

Data used in predicting greenhouse gas emissions may be obtained by the greenhouse gas mitigation system from a local datastore of data and/or from remote datastores. Such datastores may store in databases, among other information, information for different types of cryptocurrency, such as the estimated amount of greenhouse gasses (e.g., carbon emissions) emitted per crypto-transaction for a given type of cryptocurrency (which may optionally include the total energy of the entity that mined a given tokens as well as all the energy estimated to be consumed by other miners who were involved, but did not win, and which may optionally factor in the power source used by a given miner, such as coal, natural gas, solar, hydro, etc.), the estimated energy used per crypto-transaction for a given type of cryptocurrency, and/or the amount of different types of offsets need to offset a transaction for a given type of cryptocurrency (e.g., the number of trees needed to offset the emissions, the number of solar panels for a given period of time needed to offset the emissions, the amount of ground cover needed to offset the emissions, the amount of clean water needed to be provided to reduce a corresponding amount of wood burning for purifying water and to thereby offset the emissions, etc.). By way of further example, emissions per transaction of a given cryptocurrency may be determined using the total energy, the number of transactions, and a regional weighted electricity emission factor.

Optionally, the system may calculate a central tendency (e.g., an average or median) emissions factor per crypto-transaction, optionally per government issue currency (e.g., per dollar) equivalent (e.g., measuring, for a given cryptocurrency, one cryptocurrency conversion to one United States dollar transaction) and/or per specified cryptocurrency. Optionally, an average emissions factor may be calculated and applied to some or all crypto-transactions managed by the system in order to estimate the carbon footprint of the corresponding crypto-transactions. Optionally, the emissions factor may be a central tendency (e.g., an average or median) of a set of some or all of the cryptocurrency types supported by the system. Optionally, a recommendation may be generated for a portfolio/set of carbon offset projects (e.g., verified carbon offset projects) offered through a certification platform or other type of platform, such as the UN Climate Neutral Now platform.

For example, the number of trees needed to offset a given amount of carbon may be determined based on periodic, direct measurements of carbon in forestry stock, direct carbon flux measurements (that measures the flow of carbon into and out of a forest), and/or inventory-based carbon accounting models (e.g., C-Flow, Carbine, C-Sort, FullCAM or other carbon accounting models). By way of illustration, a carbon accounting model may estimate the carbon stock change in ecosystems including above and belowground biomass, standing and decomposing debris, and/or soil carbon resulting from land use and management activities.

Such offset may be less than, approximately the same as, or greater than the predicted carbon or other greenhouse emissions associated with the computer operations utilized in minting a token and/or other computer processes and operations. Thus, the offset may partially, wholly, or overcompensate for the carbon or other greenhouse emissions associated with the computer processes and operations.

The carbon offset may involve carbon sequestering to remove carbon for the atmosphere, where the carbon may be stored in a natural or artificial reservoir. For example, carbon sequestering may be accomplished by the planting of trees and/or other plants, using subsurface saline aquifers, peat bogs, bio-energy, biochar (charcoal produced by pyrolysis of biomass in the absence of oxygen;), bio-energy, ocean fertilization, and/or the like. By way of example, emissions may be passed through a vessel with a liquid solvent that absorbs the carbon dioxide. The solvent may be heated in a tower structure (sometimes referred to as a stripper or regenerator), to remove the carbon dioxide. The carbon dioxide may be conducted to an underground storage facility. Offsets may also be accomplished by the funding of green, renewable energy sources, such as wind, solar, or hydro-electric generators. Offsets may also be accomplished by the provision of clean water via non-polluting means (e.g., clean water wells) to reduce the amount of carbon-emitting techniques (e.g., the burning of wood or coal) needed to purify water, or the funding thereof.

Thus, a portfolio of offsets, including a single offset type or a set of different offset types, may be utilized to offset the predicted greenhouse emissions resulting from computer systems processing a crypto mining operation and/or other computer operations (e.g., resulting from the execution of computer instructions, from computer cooling systems, and/or the like). Optionally, a user interface may be displayed to the user via a user device, where the user interface is populated by the disclosed system(s) with offset options from which the user can choose. Optionally, the user interface may be configured to enable the user to specify specific amounts or percentages of offset types to be used in providing greenhouse case emission offsets. For example, a user may choose to offset half of the predicted greenhouse gasses involved in processing a user donation (or other token provisioning) via the planting of trees and offset half of the greenhouse gasses via the funding of green energy sources. Optionally, the user interface may be configured to enable the user to specify other criteria to control which offsets or set of offsets are to be used. For example, the user may be enabled to specify a location (e.g., country, state, city, etc.) of a greenhouse gas reservoir that is to be funded.

The resources for funding the greenhouse gas offset may be apportioned from the tokens provided by the user, may be provided by the system operator, may be provided by a third party (e.g., a sponsor), may be provided by a governmental entity, or may otherwise be provided.

Certain aspects will now be described with reference to the figures.

Figure 1A:
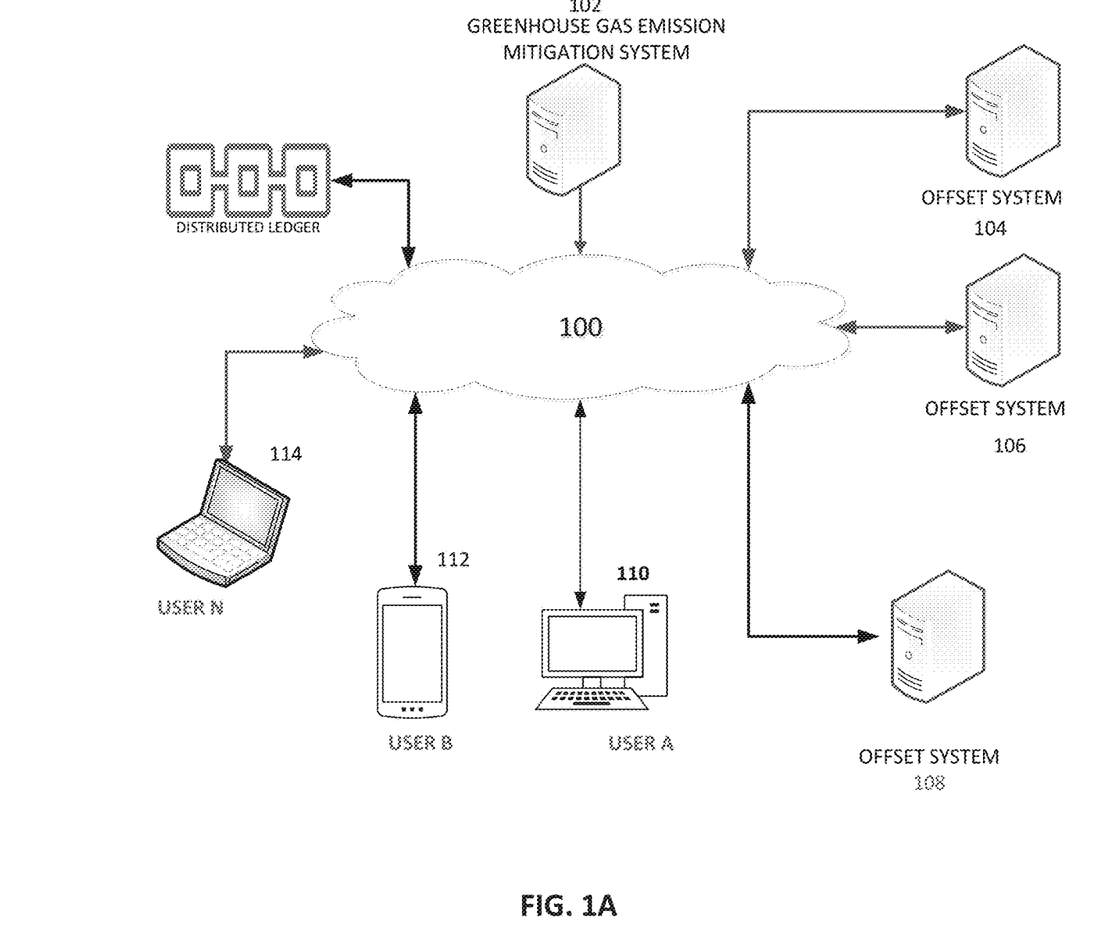
FIG. 1A illustrates an example operating environment of networked computer systems that enables inter-computer communications and data transfers.

FIG. 1A illustrates an example networked environment that may be utilized to practice the example processes herein. A greenhouse gas mitigation system 102 may communicate via a network 100 (e.g., the Internet, an intranet, a cellular network, and/or other network) with one or more computer-based offset systems 104, 106, 108, which may optionally be operated by different entities.

For example, a given offset system may be configured to initiate greenhouse gas mitigation processes in response to a communication from the greenhouse gas mitigation system 102. A given offset system may include a network interface configured to communicate with the greenhouse gas mitigation system 102 and optionally other systems via the network 100. The communication from the greenhouse gas mitigation system 102 may specify a funding amount, an offset type, and/or an amount of offset. Optionally, the specification of the offset type and/or amount may be provided by a third party networked computer system instead of or in addition to the greenhouse gas mitigation system 102. The third party system may provide such specification of the offset type and/or amount to the greenhouse gas mitigation system 102 and/or directly to the offset system.

The greenhouse gas mitigation system 102 may be configured to store and/or access one or more models and/or data configured to determine greenhouse gas emissions for various computer processes (such as those described herein)

and/or configured to determine an amount or degree of offsets needed to mitigate the greenhouse gas emissions.

The greenhouse gas mitigation system 102 may store user data, such as user name, email address, phone number/SMS/text messaging address, physical address, historical token provision history (e.g., donations, including types of tokens donated, number of tokens donated, value of donated tokens in a government currency at the time of donation, date of donation, donation recipient, and/or the like), offset history (e.g., the amount of greenhouse emissions offset, the type of offsets, the quantity of offsets, where the offsets were implemented, and/or other offset characteristics, such as those described herein), cryptocurrency preferences (e.g., the types of cryptocurrency the user prefers and/or tends to use to make donations), offset preferences (e.g., the type of offsets the user prefers, the location (e.g., country, state, or city) that user prefers the offsets to be implemented in, and/or the like), and/or preferred token recipients (e.g., preferred charities), and/or other user information. Optionally, user preferences (e.g., offset preferences, cryptocurrency preferences, and/or recipient preferences) may be explicitly specified by the user via a preference user interface provided by the system or a dedicated application and/or may be inferred from the user's historical information (e.g., token provision history, recipient history, offset history, and/or other historical data related to transactions).

The greenhouse gas mitigation system 102 may also be configured to store and/or access data related to the amount of greenhouse emissions for different cryptocurrencies, calculate or access calculations as to how much of one or more types of offsets are needed to offset a given processing of a cryptocurrency transaction, and/or a central tendency (e.g., an average or median) emissions factor per crypto-transaction per government issue currency. Optionally, an average emissions factor may be calculated and applied to some or all crypto-transactions managed by the system in order to estimate the carbon footprint of the corresponding crypto-transactions. Optionally, the system may generate or access a recommended portfolio/set of carbon offset projects (e.g., based on user preferences, based on offset project certifications, based on the user location, based on the offset project location, based on the amount of offsets needed, based on the cost of the offsets, and/or the like).

The greenhouse gas mitigation system 102 may also be configured to execute in whole or in part processes described herein, to provide user interfaces described herein, to receive user data and instructions, such as those described herein, and to perform inter-computer data transfers and communications.

Figure 1B:
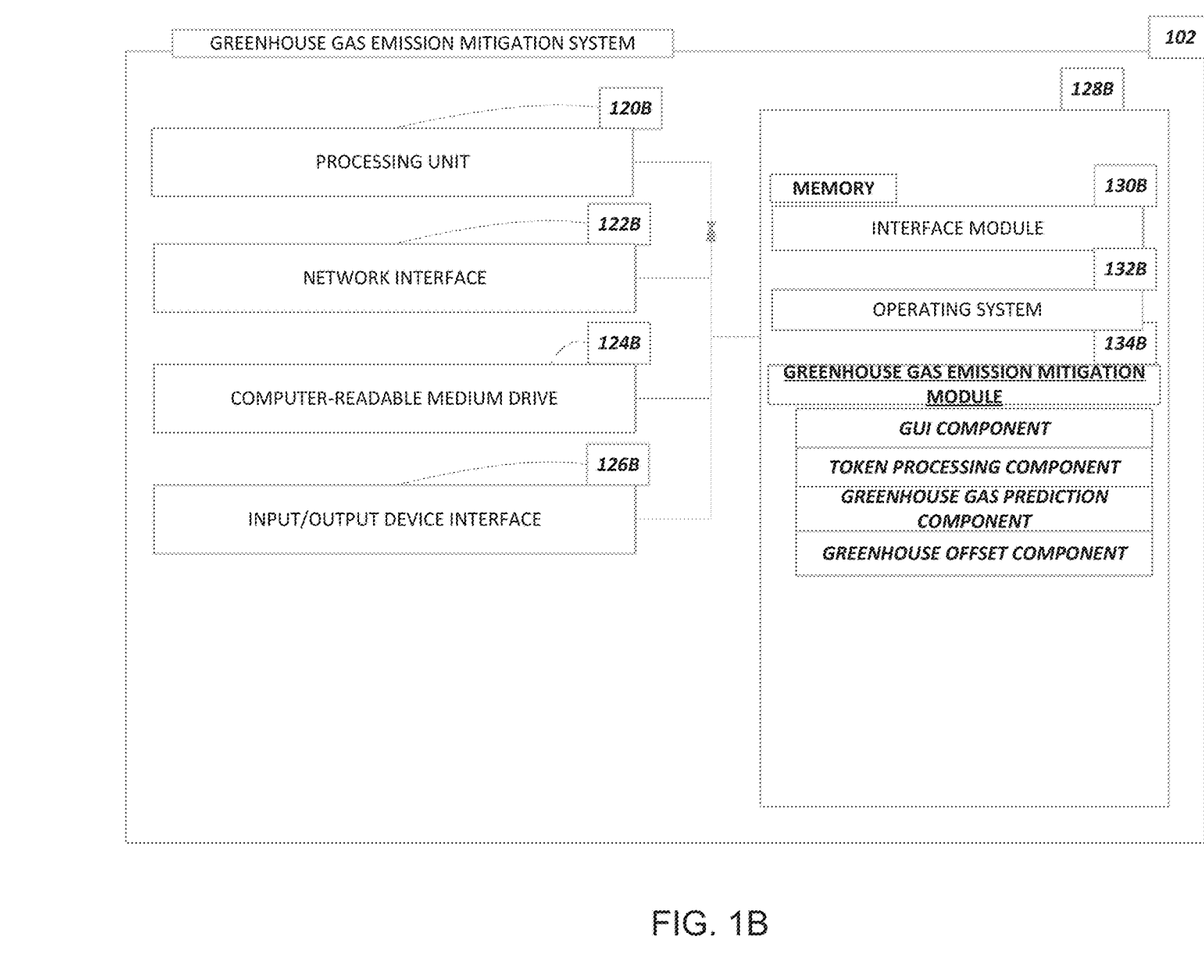
FIG. 1B illustrates an example architecture of a computer-based greenhouse gas mitigation system.

FIG. 1B is a block diagram illustrating example components of the greenhouse gas mitigation system 102. The example greenhouse gas mitigation system 102 includes an arrangement of computer hardware and software components that may be used to implement aspects of the present disclosure. Those skilled in the art will appreciate that the example components may include more (or fewer) components than those depicted in FIG. 1B. The greenhouse gas mitigation system 102 may comprise a cloud-based computer system.

With respect to the cloud-based computer system optional implementation, the cloud-based computer system may comprise a hosted computing environment that includes a collection of physical computing resources that may be remotely accessible, located at different facilities, and may be rapidly provisioned as needed (sometimes referred to as a "cloud" computing environment). Certain data described herein may optionally be stored using a data store that may comprise a hosted storage environment that includes a collection of physical data storage devices that may be remotely accessible and may be rapidly provisioned as needed (sometimes referred to as "cloud" storage).

The greenhouse gas mitigation system 102 may include one or more processing units 120B (e.g., a general purpose processor unit (CPU) and/or a high speed graphics processor unit (GPU) to aid in processing crypto-transactions), one or more network interfaces 122B, a non-transitory computer-readable medium drive 124B, and an input/output device interface 126B, all of which may communicate with one another by way of one or more communication buses. The network interface 122B may provide services described herein with connectivity to one or more networks or computing systems (e.g., offset systems, user devices, distributed ledgers, offset computer systems, emission prediction computer systems, energy consumption prediction computer systems, etc.). The processing unit 120B may thus receive information (e.g., user data, instructions, emissions data, energy consumption data, offset data, other data disclosed herein, and other data) and instructions from other computing devices, systems, or services via a network, and may provide responsive data and/or execute instructions. The processing unit 120B may also communicate to and from non-transitory computer-readable medium drive 124B and memory 128B, and further provide output information via the input/output device interface 126B. The input/output device interface 126B may also accept input from one or more input devices, such as a keyboard, mouse, digital pen, touch screen, microphone, camera, etc.

The memory 128B may contain computer program instructions that the processing unit 1206 may execute in order to implement one or more aspects of the present disclosure. The memory 128B generally includes RAM, ROM (and variants thereof, such as EEPROM) and/or other persistent or non-transitory computer-readable storage media. The memory 128B may store an operating system 132B that provides computer program instructions for use by the processing unit 120B in the general administration and operation of a greenhouse gas emission mitigation module 134B, including its components. The memory architecture may be configured so that memory 128B includes non-transitory computer-readable medium drive 124B.

The memory 128B may store user accounts and data, such as user name, email address, phone number/SMS/text messaging address, physical address, local government currency of the user, historical token provision history (e.g., donations, including types of tokens donated, number of tokens donated, value of donated tokens in a government currency at the time of donation, and/or date of donation, and/or the like), offset history (e.g., the amount of greenhouse emissions offset, the type of offsets, the quantity of offsets, where the offsets were implemented, and/or other offset characteristics, such as those described herein), user specified or inferred cryptocurrency preferences (e.g., the types of cryptocurrency prefers and/or tends to use to make donations or other transfers), user specified or inferred offset preferences (e.g., the type of offsets the user prefers, the location (e.g., country, state, or city) that user prefers the offsets to be implemented in), and/or user specified or inferred preferred token recipients (e.g., preferred charities), and/or other user information. As disclosed elsewhere herein, user preferences may be explicitly specified by the user via a preference user interface and/or may be inferred from the user's historical information (e.g., token provision history, recipient history, offset history, and/or other historical data related to transactions).

The memory 128B may also store data related to the amount of greenhouse emissions for different cryptocurrencies and/or other data described herein. It is understood that a given item of data may be in addition or instead be stored on non-transitory computer-readable medium drive 124B.

Some or all of the data and content discussed herein may optionally be stored in a relational database, a SQL database, a NOSQL database, or other database type. Optionally, the memory 128B may include one or more third party cloud-based storage systems. A given database may optionally cache most-likely-needed data in relatively high speed RAM but purge the data from RAM to relatively slower non-transitory storage when it is estimated that the data will not be needed in the near term. A given database may pull newly requested, but un-cached, data from non-transitory storage into RAM when needed to reply to database queries and/or for operations.

The greenhouse gas emission mitigation module 134B may include a GUI component that generates and/or populates graphical user interfaces and processes user inputs, such as those described herein. For example, such user interfaces may enable a user to specify user data and preferences, such as user data and preferences discussed elsewhere herein, user interfaces via which the user can specify a recipient (e.g., a donation recipient), whether certain user information is to be shared with a recipient, an amount and type of tokens or other currencies being provided/donated, and/or offset type(s) and/or offset criteria. The greenhouse gas emission mitigation module 134B may include a token processing component that converts tokens provided by the user into another currency (e.g., a currency issued by a government where the recipient is located) and transfer the currency to the recipient. The greenhouse gas emission mitigation module 134B may also convert a user-specified currency amount in a government issued currency into a token amount of a user specified token type.

A greenhouse prediction component may be configured to estimate or access an estimate of the amount of greenhouse gas emissions (and/or the creation of other pollutants) associated with processing the designated/provided cryptocurrency. For example, as disclosed elsewhere herein, the greenhouse gas emission prediction may be based on a variety of factors, such as the type of energy that will be or that is predicted to be used to perform the computer operations, energy consumption for cooling computer systems and associated facilities, server energy consumption for hosting and processing a token transaction, energy consumption for delivering communications related to the transaction, (e.g., transmission of a receipt to the user that made a token donation to a recipient, transmission to the recipient regarding the donation), energy consumption for recording the transaction on a synchronized distributed database (e.g., a distributed general ledger, such as a blockchain), energy consumption for verifying funds, and/or energy consumption for converting tokens into a government currency that is local to the recipient. The prediction may utilize a datastore that includes estimates of greenhouse gas emissions for a given transaction for different types of cryptocurrencies.

A greenhouse offset component may be configured to determine and/or recommend one or more offset types and quantities to offset the predicted greenhouse gas emissions. For example, as disclosed herein, one or more carbon accounting models may be utilized in determining a quantity of a given offset type (e.g., a number of trees) needed to offset the predicted emissions. The greenhouse offset component may specify a set of different types of offsets to offset the predicted emissions (e.g., tree planting, agriculture, artificial extraction of carbon from the atmosphere, subsurface saline aquifers, peat bogs, bio-energy, biochar, and/or the like). For example, carbon sequestering may be accomplished by the planting of trees and/or other plants, using subsurface saline aquifers, peat bogs, bio-energy, biochar (charcoal produced by pyrolysis of biomass in the absence of oxygen;), bio-energy, ocean fertilization, or the like. By way of example, emissions may be passed through a vessel with a liquid solvent that absorbs the carbon dioxide. The solvent may be heated in a tower structure (sometimes referred to as a stripper or regenerator, to remove the carbon dioxide. The carbon dioxide may be conducted to an underground storage facility. Offsets may also be accomplished by the funding of green, renewable energy sources, such as wind, solar, or hydro-electric generator.

The memory 128B may include an interface module 130B. The interface module 130B can be configured to facilitate generating one or more interfaces through which a compatible computing device may send to, or receive data and/or instructions from the greenhouse gas emission mitigation module 134B.

Figure 2:
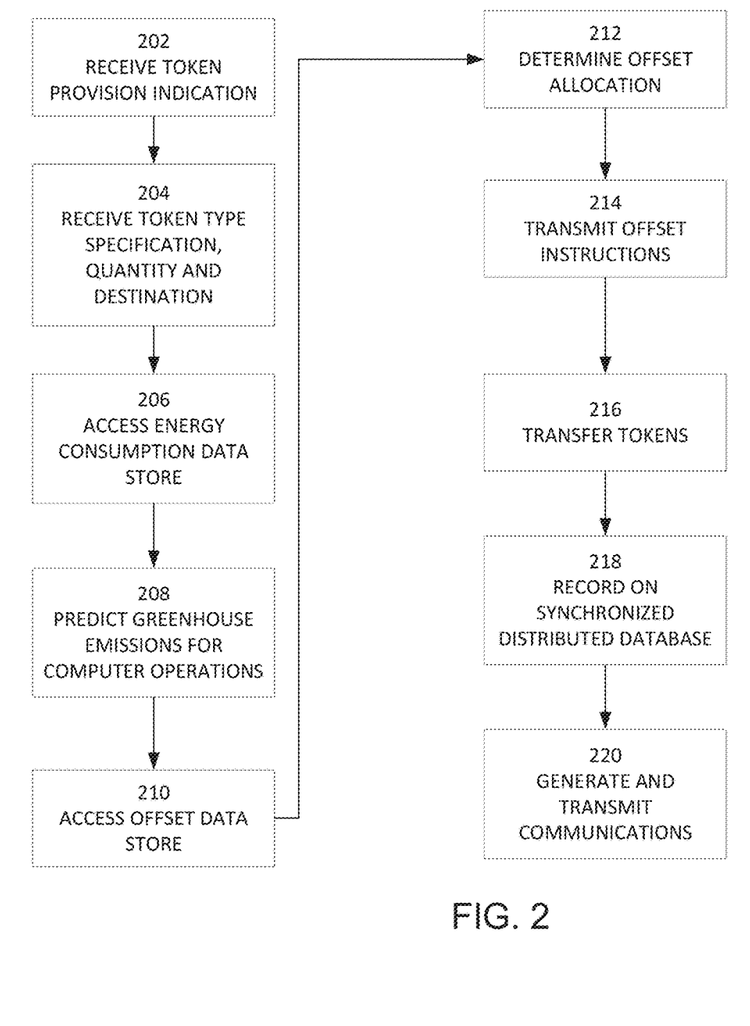
FIG. 2 illustrates an example computer-implemented process.

Referring now to FIG. 2, an example greenhouse gas emission determination and offset process is illustrated. The process may be executed in whole or in part by the systems and devices disclosed herein (e.g., the greenhouse gas emission mitigation system, and/or one or more offset systems, and/or one or more user devices).

At block 202 a token provision initiation process indication is received. For example, the token provision initiation process indication may optionally be received from a dedicated application hosted on a user device (e.g., an application specifically configured to enable a user to make donations to a specified recipient), via a webpage (e.g., hosted on a webserver) presented on the user device by a browser, or otherwise. The indication may indicate that the user has accessed the dedicated application or webpage. Optionally, the indication may be received in association with user authentication data (e.g., a user identifier and/or password). Optionally, a user account record, if such exists, may be accessed from memory. Data from the user account record may be retrieved and used to populate a user interface on the user device. For example, the user name, historical recipients and/or favorite recipients (where the user may have designated certain recipients as favorites so that they will be more prominently display and/or easily accessed), types of tokens previously provided by the user, amounts of tokens previously provided by the user, and/or other user data disclosed herein may be used to populate the user interface for display to the user.

At block 204, a specification of a token type (e.g., BITCOIN, ETHEREUM, TETHER, BNB, USD COIN, XRP, TERRA, DOGECOIN, BINANCE, ETC.), a quantity of tokens (which may include a fractional amount), and/or a recipient is received from the user device (e.g., via the user interface), where the user is requesting a transfer corresponding to the tokens to the recipient. For example, the user interface may include a menu of token types from which the user may select (e.g., those supported by the system), a field or menu configured to receive a token quantity user specification, a field or menu configured to receive a user recipient designation. Optionally, the specific quantity and type of cryptocurrency being used may be specified via a unique identifier, a transaction ID, and/or the like, that is then looked up in a record or table that identifies the corresponding token type and quantity. Optionally, the user may specify the amount to be provided to the user in a government currency rather than in tokens, and the system may convert that amount to a corresponding amount in the user specified cryptocurrency. The user interface may also enable the user to specify a cryptocurrency wallet or platform from which the specified amount may be transferred.

At block 206, one or more local and/or remote data stores may be accessed that includes data providing an estimate of how much energy will be consumed by processing all or a portion of the transaction. For example, energy consumption data may be accessed for different aspects of a token transaction process, such as for different aspects of the process illustrated in FIG. 2. The aspects of the transaction may include crypto mining processes, database recording processes, verification processes, notification processes, hosting processes, currency conversion processes, other processes described herein, and/or other processes.

By way of illustration, transactions in a blockchain network are grouped into blocks that are linked together to form a chain of blocks. A block is a container including transaction details. A block include primary attribute fields, such as a previous hash (the value of the hash of the previous block, which is used to link blocks), data (the aggregated set of transactions that were mined and validated and included in the block), a nonce (a random value used to vary the output of the hash value), and a hash (the value obtained by passing the previous hash value, the data and the nonce through the SHA-256 algorithm which acts is the digital signature of the block). SHA-256 is a cryptographic hash algorithm that produces a unique 256-bit alphanumeric hash value for a given input.

Blockchain transactions are stored in chronological order marked by timestamps and hash functions. Records stored in the blockchain network are permanent and immutable, where a record or transaction added to the blockchain cannot be modified or altered, so that transactions are protected from hacking. The crypto mining process may include energy-intensive computer-implemented operations configured to solve complex cryptographic hash puzzles to verify blocks of transactions that are updated on a synchronized distributed database (e.g., a decentralized blockchain ledger).

At block 208, a prediction of greenhouse emissions associated with the estimated energy consumption may be generated. For example, the prediction may be accessed from a data store and/or generated, optionally in real time, using one or more models (e.g., carbon footprint estimation models). For example, a model may take into account the emissions resulting from the activities of cryptocurrency miners in utilizing computational resources (and related activities, such as air conditioning) to verify crypto-transactions as well as the emissions resulting from the activities of the greenhouse gas emission mitigation system, the offset systems, and/or .user devices.

The model may take into account the type of cryptocurrency validation performed. For example, Proof of Work (PoW) validation may result in higher energy consumption as compared to Proof of Stake (PoS) validation. Further, the type of validation may be used in predicting the amount of associated E-waste (e.g., discarded electrical or electronic devices). By way of illustration, cryptocurrencies that rely on Proof of Work validation tend to cause more E-waste. In Proof of Work validation, the first miner to solve (typically using specialized computing equipment) a cryptographic puzzle (finding a target hash) gets to add a block of transactions and earn corresponding rewards. In Proof of Stake validation, mining is not performed. Instead, currency owners stake their cryptocoins and the protocol randomly selects a validator who adds a block and earns rewards.

Optionally, the prediction may take into account the locations or predicted locations of the systems and devices whose activities are included in the greenhouse emission predictions. Using the locations, the average emissions may be estimated based on the electricity generation mix for a local electricity grid. For example, certain locations may be more likely to utilize highly polluting energy sources (e.g., coal) and certain locations may utilize less polluting energy sources (e.g., solar or hydro energy). Optionally, current profitability of mining may be taken into account in the greenhouse emission prediction. For example, a correlation has been identified, wherein the larger the profitability of mining (i.e., increased value of cryptocurrency), the higher the likelihood of market participants using suboptimal power efficiency (e.g., high energy consuming dated equipment). Different Optionally, the predicted emissions may be reduced based on green electricity purchases, renewable energy power purchase agreements, and/or renewable energy certificates associated with one or more of the systems and devices.

Optionally, the process does not estimate how much energy will be consumed by processing the transaction, but directly determines or accesses a prediction of greenhouse emissions associated with processing the transaction (which may have been generated using an energy consumption estimate).

At block 210, one or more local and/or remote emissions offset datastores may be accessed, and emission offset data may be retrieved (e.g., over a network). For example, the emission offset data may indicate the number of trees (which may include a fractional amount, such as 0.1 trees) needed to offset a specified amount of greenhouse gas (e.g., carbon dioxide) emissions. By way of further example, the emission offset data may indicate the number of methane digesters (used to manage livestock waste) needed to offset a specified amount of greenhouse gas (e.g., carbon dioxide) emissions. By way of yet further example, the emission offset data may indicate the amount of cover crops are needed to offset a specified amount of greenhouse gas emissions. By way of still further example, the emission offset data may indicate how many solar, wind or hydro devices (which may include a fractional amount) are needed to offset a specified amount of greenhouse gas emissions. By way of additional example, the emission offset data may indicate how many clean water wells are needed to offset a specified amount of greenhouse gas emissions (where the use of clear water wells in poor countries may reduce the need to burn wood and coal to boil and purify water).

Thus, an offset may represent an actual net reduction in emissions, an offset may result in a permanent reduction of emissions, and/or an offset may be registered and tracked to ensure it is not double-sold. An offset may be quantifiable where the offset project emission reductions can be quantified in tons of CO2 equivalent or other units of measurement. An offset may be selected via a governmental or non-governmental entity program. For example, an offset may be selected using the United Nations Climate Neutral Now program. Through this program, organizations invest in Certified Emission Reductions (CERs) from the United Nations Carbon Offset Platform. The CERs are generated from Clean Development Mechanism (CDM) projects, which are located in developing countries. These projects, currently earn 1 CER for each ton of greenhouse emissions they reduce or avoid, and are measured in CO2e (Carbon dioxide equivalent).

At block 212, a portfolio of one or more offset types/sources may be selected sufficient to offset some, all, or in excess of the estimated greenhouse gas emissions. For example, the portfolio may include one or more of the offset types described herein. One or more factors may be utilized in determining the portfolio. For example, a rule may specify a percentage of the predicted greenhouse gas emissions that will be offset. Another rule may specify one or more locations where offsets are to be provided. User specified preferences may be utilized in selecting the types and locations of the offsets. As discussed elsewhere herein, optionally user may be enabled to specify preferred offset types and/or locations, and such preferences may be stored in a user record.

At block 214, offset instructions may be transmitted (e.g., over a network) to one or more offset computer systems configured to cause the offsets to be implemented. Optionally, the process may determine the source of funding for a given offset and transfer such funding to the offset implementer. For example, the funding may offset may be provided by the user providing the tokens (e.g., apportioned from the tokens provided by the user), may be provided by the system operator, may be provided by a third party (e.g., a sponsor), may be provided by a governmental entity, or may otherwise be provided.

At block 216, the tokens provided by the user may be converted to a currency local to the recipient, and the local currency may be transferred to an account associated with the recipient. Optionally, the tokens may be transferred to an account (e.g., a wallet) associated with the recipient, without the conversion to a local currency.

At block 218, the transfer and/or other aspects of the transaction may optionally be recorded on a distributed synchronized database (e.g., a distributed general ledger, such as a blockchain). At block 220, one or more communications may be generated and transmitted over a network to one or more recipients. For example, an electronic receipt may be generated and transmitted to the user (e.g., via email, messaging service, document download, or otherwise) that indicates the amount and type of tokens provided by the user, the value of the tokens in a government issued currency (e.g., the local currency of the user and/or of the recipient), the identity of the recipient, and/or the amount and/or types of offsets initiated. By way of further example, a communication may be generated and transmitted to the recipient, including the name of the user, the user's electronic address (e.g., email address, messaging service address, and/or other address), the amount and type of tokens provided to the recipient, the value of the tokens in a government issued currency (e.g., the local currency of the user and/or of the recipient), and/or the amount and/or types of offsets initiated. Optionally, the user may be enabled to opt-out of having certain information provided to the recipient (e.g., name, email address, phone number, and/or the like) so as to enhance the user's privacy.

Certain example user interfaces will now be described with reference to the figures.

Figure 3A:
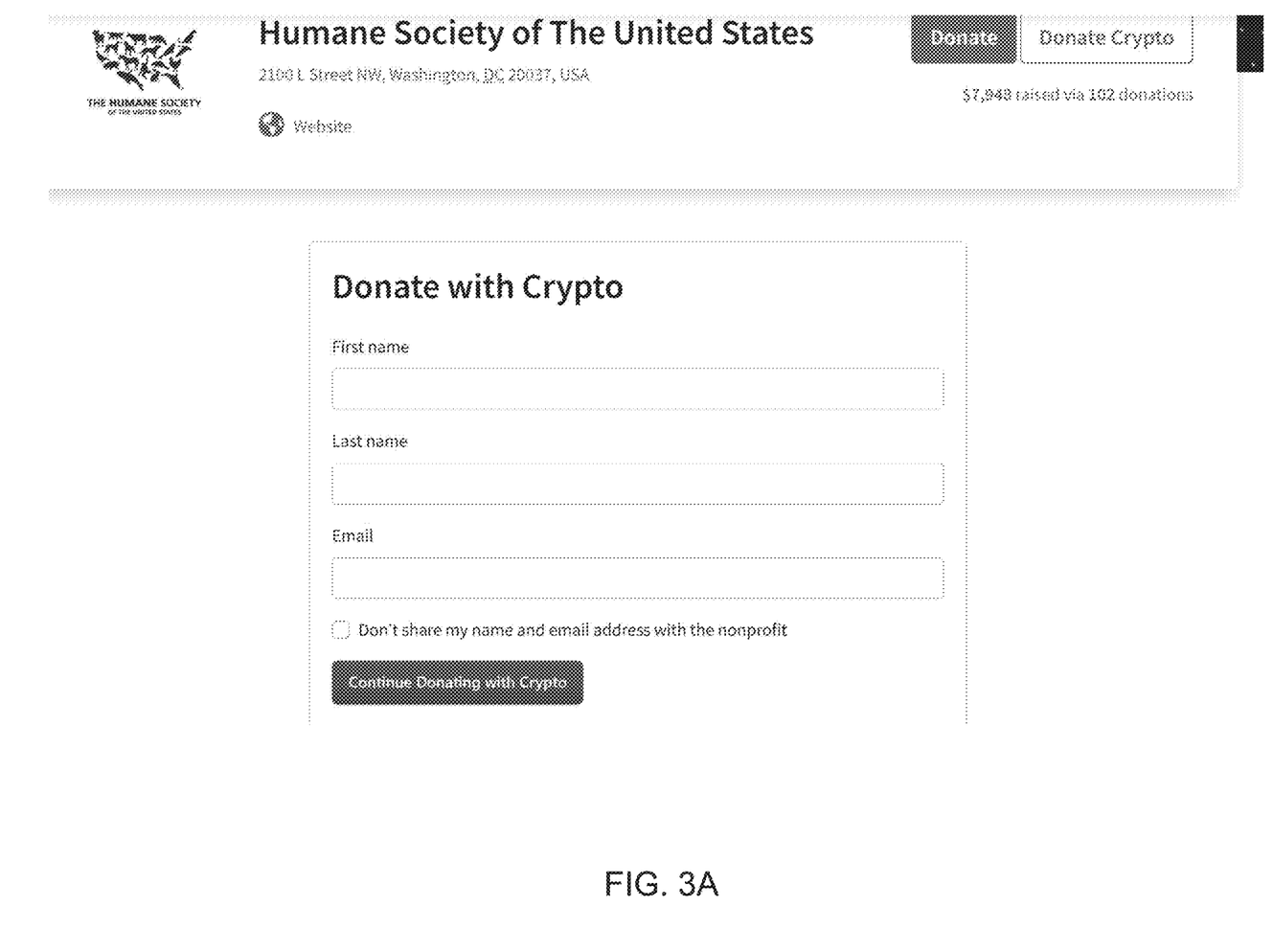
FIGS. 3A, 3B illustrate example user interfaces.

FIG. 3A illustrates an example user interface that may optionally be accessed by a user without having an account with the mitigation system and without logging in. Fields are provided via which the user may specify the user's first name, last name, and electronic address (e.g., email address, although in addition or instead, a mobile phone number field may be provided). A control is provided via which the user may inhibit the system from providing the user's name and/or electronic address to the recipient (e.g., a nonprofit organization).

Figure 3B:
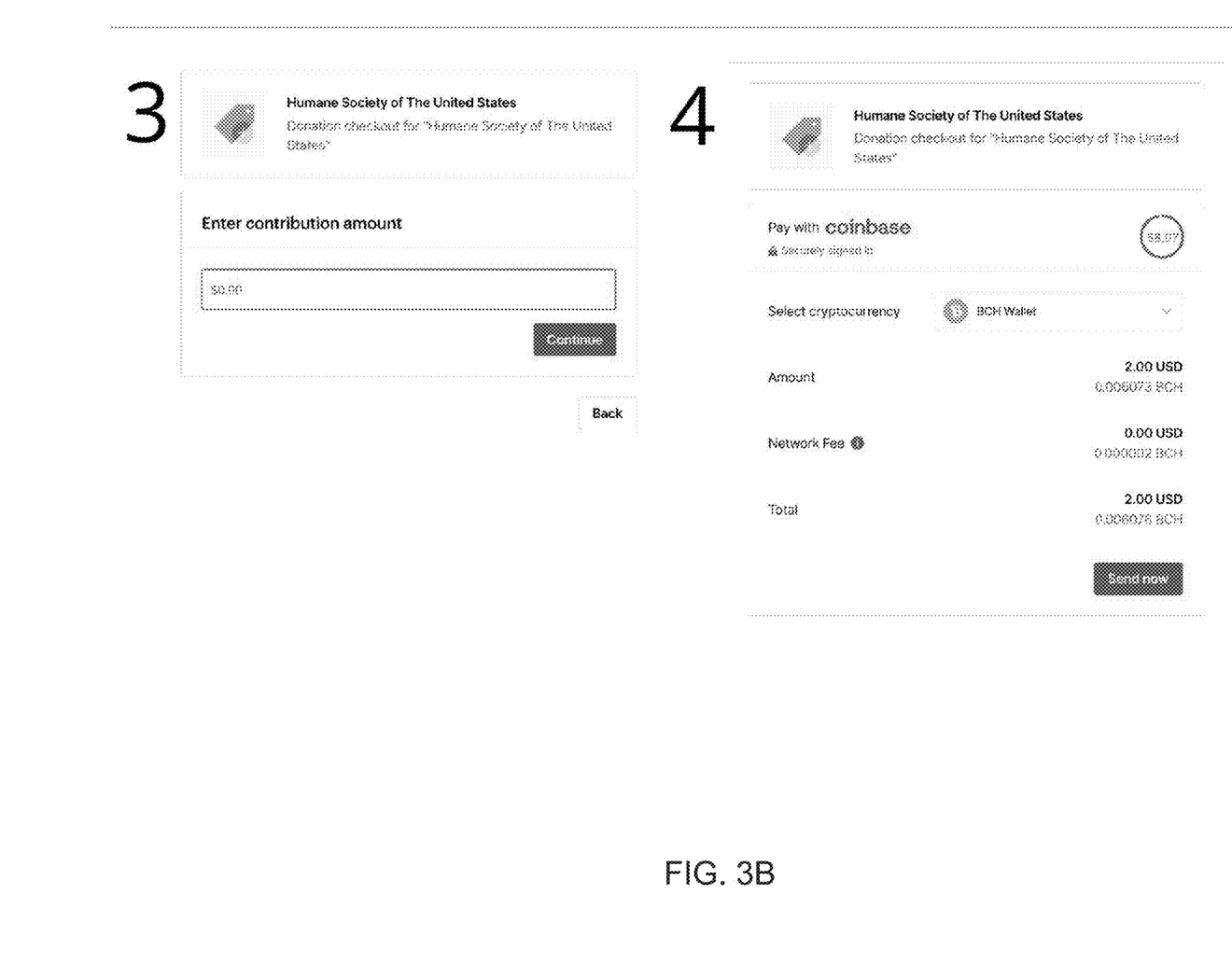

FIG. 3B illustrates a user interface via which the user may enter a contribution amount, select an online cryptocurrency platform (that enables buying, selling, transferring, and storing cryptocurrency), specify a cryptocurrency type, and specify an amount to be provided to the recipient (specified as a government issued currency amount or as a cryptocurrency amount). Where the user specifies an amount in a government issued currency, the system may automatically convert the government issued currency amount to an amount in the specified cryptocurrency, and the user interface may display both the government issued currency amount and the cryptocurrency amount. The system may calculate or select a network fee associated with the cryptocurrency transaction and cause the user interface to display the network fee in the government issued currency amount and/or the cryptocurrency amount. A total of the user specified amount and the network amount may be calculated and displayed via the user interface in the government issued currency amount and/or the cryptocurrency amount.

Optionally, a field or menu may be provided via which the user may specify the recipient. Optionally, the recipient is pre-specified, such as may be the case if the user accesses the recipient's website and access the user interface illustrated in FIG. 3B (or the like) via the recipient's website.

Although the foregoing examples describe the prediction and offsets of greenhouse gas emissions in the context of the cryptocurrency transactions, the processes may similarly be used to offset other computer operations, such as artificial intelligence/learning engine training (e.g., the training of algorithms that parse data and learn from the data to make informed decisions, deep neural networks, deep belief networks, deep reinforcement learning, recurrent neural networks, convolutional neural networks, classification and regression trees, and/or the like).

A prediction model may estimate energy consumption (and the resulting greenhouse emissions) as a function of computer run time, the number, type and process time of computing cores (central processing units and/or graphic processing units), the amount and type of memory utilized (e.g., the number of read/write operations to RAM and/or magnetic memory) and the power utilization of these resources. The prediction model may in addition input the energy utilized in ancillary functions, such as for air conditioning, heating, lighting, and/or the like.

Thus, systems and methods are described configured to predict an amount of energy consumed by various types of computer-implemented operations, predict associated greenhouse gas emissions, determine an offset portfolio, and cause the greenhouse gas emission offsets to be initiated, optionally utilizing multicomputer data transfers The methods and processes described herein may have fewer or additional steps or states and the steps or states may be performed in a different order. Not all steps or states need to be reached. The methods and processes described herein may be embodied in, and fully or partially automated via, software code modules executed by one or more general purpose computers. The code modules may be stored in any type of computer-readable medium or other computer storage device. Some or all of the methods may alternatively be embodied in whole or in part in specialized computer hardware. The systems described herein may optionally include displays, user input devices (e.g., touchscreen, keyboard, mouse, voice recognition, etc.), network interfaces, etc.

The results of the disclosed methods may be stored in any type of computer data repository, such as relational databases and flat file systems that use volatile and/or nonvolatile memory (e.g., magnetic disk storage, optical storage, EEPROM and/or solid state RAM).

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, other solid state memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications/alerts and user interfaces described herein may be provided via a Web page, a dedicated or non-dedicated phone application, computer application, an operating system, a short messaging service message (e.g., SMS, MMS, etc.), instant messaging, email, push notification, audibly, a pop-up interface, and/or otherwise.

The user terminals described herein may be in the form of a mobile communication device (e.g., a cell phone), laptop, tablet computer, interactive television, game console, media streaming device, head-wearable display, networked watch, etc. The user terminals may optionally include displays, user input devices (e.g., touchscreen, keyboard, mouse, voice recognition, etc.), network interfaces, etc.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description.

All changes which come within the meaning and range of equivalency of the claims are to be embraced within their scope.

What is claimed is:

1. A networked computer system, comprising:
   a network interface;
   at least one processing device operable to:
   receive via the network interface a request for a first transfer of resources from a first source to a first destination;
   predict energy utilization associated with execution of computer operations by a plurality of distributed networked computer systems to implement the first transfer of resources from the first source via multicomputer data transfers, the computer operations comprising solving mathematical algorithmic problems and recording a data block on a distributed synchronized database;
   enable a set of one or more emission offsets corresponding to a predicted emission footprint related to the energy utilization associated with the execution of computer operations used in performing the first transfer of resources from the first source to the first destination by the plurality of distributed networked computer systems to be determined, the set of one or more emission offsets comprising sequestering to remove carbon dioxide for an atmosphere via:
   planting of an organism,
   subsurface saline aquifers,
   peat bogs,
   bio-energy,
   biochar,
   ocean fertilization, and/or
   passing emissions through a vessel with a liquid solvent that absorbs carbon dioxide and conducting the carbon dioxide; and
   initiate the determined set of one or more emission offsets, corresponding to the predicted emission footprint related to the energy utilization associated with the execution of computer operations used in performing the first transfer of resources from the first source to the first destination by the plurality of distributed networked computer systems, by transmitting an instruction to at least one remote networked computer system to implement at least a portion of the determined set of one or more emission offsets.

2. The networked computer system as defined in claim 1, wherein the first transfer of resources comprises a token transfer and wherein the prediction of energy utilization associated with the execution of computer operations by the plurality of distributed networked computer systems to implement the first transfer of resources from the first source via multicomputer data transfers is based at least in part on a type of token being transferred.

3. The networked computer system as defined in claim 1, wherein the set of one or more emission offsets comprises a renewable energy source.

4. The networked computer system as defined in claim 1, wherein the data block comprises a hash value of a previous data block, validated data, a nonce, and a hash generated by passing the previous hash value, the validated data, and the nonce through a hash algorithm.

5. The networked computer system as defined in claim 1, wherein the computer operations comprise energy consumption for inter-computer communications.

6. The networked computer system as defined in claim 1, wherein the networked computer system comprises a cloud-based computer system including a plurality of distributed computer systems.

7. The networked computer system as defined in claim 1, wherein one or more assets used to implement the determined set of emission offsets are provided from the first source, an operator of the networked computer system, and/or a second source.

8. A computer-implemented method, the method comprising:
   receiving via over a network a request for a first transfer of resources from a first source to a first destination;
   predicting, using one or more computer systems, an emission amount related to an energy utilization associated with an execution of computer operations by a plurality of distributed networked computer systems,
   wherein the energy utilization is associated with the execution of the computer operations by the plurality of distributed networked computer systems in implementing the first transfer of resources to the first destination, the computer operations comprising solving mathematical algorithmic problems and recording a data block on a distributed synchronized database;
   using one or more computer systems to enable an identification of a set of one or more emission offsets corresponding to a predicted emission footprint related to the energy utilization associated with the execution of computer operations used in performing the first transfer of resources from the first source to the first destination by the plurality of distributed networked computer systems to be determined, the set of one or more emission offsets comprising sequestering to remove carbon dioxide for an atmosphere via:
   planting of an organism,
   subsurface saline aquifers,
   peat bogs,
   bio-energy,
   biochar,
   ocean fertilization, and/or
   passing emissions through a vessel with a liquid solvent that absorbs carbon dioxide and conducting the carbon dioxide; and
   initiating the determined set of one or more emission offsets corresponding to the predicted emission footprint related to the energy utilization associated with the execution of computer operations used in performing the first transfer of resources from the first source to the first destination by the plurality of distributed networked computer systems, by transmitting an instruction to at least one remote networked computer system to implement at least a portion of the determined set of one or more emission offsets.

9. The computer implemented method as defined in claim 8, wherein the first transfer of resources comprises a token transfer and wherein predicting, using one or more computer systems, the emission amount related to the energy utilization associated with the execution of computer operations by the plurality of distributed networked computer systems is based at least in part on a type of token being transferred.

10. The computer implemented as defined in claim 8, wherein the set of one or more emission offsets comprises a renewable energy source.

11. The computer implemented method as defined in claim 8, wherein the data block comprises a hash value of a previous data block, validated data, a nonce, and a hash generated by passing the previous hash value, the validated data, and the nonce through a hash algorithm.

12. The computer implemented method as defined in claim 8, wherein the computer operations comprise energy consumption for inter-computer communications.

13. The computer implemented method as defined in claim 8, wherein the method is implemented using a cloud-based computer system including a plurality of distributed computer systems.

14. The computer implemented method as defined in claim 8, wherein one or more assets used to implement the determined set of emission offsets are provided from the first source, an operator of a first of the one or more computer systems, and/or a second source.

15. Non-transitory computer readable medium that stores computer instructions that when executed by a computing device cause the computing device to perform operations comprising:
receive a request for a first transfer of resources from a first source to a first destination;
estimate an emission amount related to an energy utilization associated with the execution of computer operations by a plurality of distributed networked computer systems,
wherein the energy utilization is associated with the execution of the computer operations by the plurality of distributed networked computer systems in implementing the first transfer of resources to the first destination;
enable a determination of a set of one or more emission offsets corresponding to the estimated emission amount related to the energy utilization associated with the execution of computer operations used in the first transfer of resources from the first source to the first destination by the plurality of distributed networked computer systems, the set of one or more emission offsets comprising sequestering to remove carbon dioxide for an atmosphere via:
planting of trees and/or other plants,
subsurface saline aquifers,
peat bogs,
bio-energy,
biochar,
ocean fertilization, and/or
passing emissions through a vessel with a liquid solvent that absorbs carbon dioxide and conducting the carbon dioxide; and
initiate the determined set of one or more emission offsets corresponding to the estimated emission amount related to the energy utilization associated with the execution of computer operations used in the first transfer of resources from the first source to the first destination by the plurality of distributed networked computer systems by transmitting an instruction to at least one destination to implement at least a portion of the determined set of one or more emission offsets.

16. The non-transitory computer readable medium as defined in claim 15, wherein the first transfer of resources comprises a token transfer and wherein estimating the emission amount related to the energy utilization associated with the execution of computer operations by the plurality of distributed networked computer systems is based at least in part on a type of token being transferred.

17. The non-transitory computer readable medium as defined in claim 15, wherein the set of one or more emission offsets comprises a renewable energy source.

18. The non-transitory computer readable medium as defined in claim 15, the computer operations comprising solving mathematical algorithmic problems and recording a data block on a distributed synchronized database, wherein the data block comprises a hash value of a previous data block, validated data, a nonce, and a hash generated by passing the previous hash value, the validated data, and the nonce through a hash algorithm.

19. The non-transitory computer readable medium as defined in claim 15, wherein the computer operations comprise energy consumption for inter-computer communications.

20. The non-transitory computer readable medium as defined in claim 15, wherein one or more assets used to implement the set of emission offsets are provided from the first source, an entity associated with the computing device, and/or a second source.

* * * * *

UNITED STATES PATENT AND TRADEMARK OFFICE
CERTIFICATE OF CORRECTION

| | |
|---|---|
| PATENT NO. | : 11,874,720 B2 |
| APPLICATION NO. | : 18/056031 |
| DATED | : January 16, 2024 |
| INVENTOR(S) | : James F. Citron |

It is certified that error appears in the above-identified patent and that said Letters Patent is hereby corrected as shown below:

In the Specification

On Column 5, Line 65: Delete "oxygen;)," and insert -- oxygen), --.

On Column 8, Line 32: Delete "1206" and insert -- 120B --.

On Column 8, Line 34: Delete "1286" and insert -- 128B --.

On Column 8, Line 43: Delete "1246." and insert -- 124B. --.

On Column 8, Line 44: Delete "1286" and insert -- 128B --.

On Column 9, Line 1: Delete "1286" and insert -- 128B --.

On Column 9, Line 5: Delete "1248." and insert -- 124B. --.

On Column 10, Line 8: Delete "oxygen;)," and insert -- oxygen), --.

On Column 11, Line 54: Delete ".user" and insert -- user --.

On Column 14, Line 50: After "transfers" insert -- . --.

In the Claims

On Column 18, Line 62: In Claim 10, after "implemented" insert -- method --.

Signed and Sealed this
Twenty-sixth Day of March, 2024

*Katherine Kelly Vidal*
Director of the United States Patent and Trademark Office